though the generation of a firing wave signal for each phase of the source which wave signals are phase displaced with respect to the phase-to-phase source voltages by a prescribed amount. Reference signals proportional to the desired output of the bridge and steering signals defining prescribed relationships between the firing wave signals are combined with the wave signals to generate signals utilized to control the conduction of the bridge rectifiers.

United States Patent [19]
Loberg

[11] 4,156,275
[45] May 22, 1979

[54] POWER CONVERSION UNIT
[75] Inventor: Hans O. Loberg, Northeast, Pa.
[73] Assignee: General Electric Company, Erie, Pa.
[21] Appl. No.: 823,606
[22] Filed: Aug. 11, 1977
[51] Int. Cl.² .................. H02P 13/26; H02M 1/14; H02M 7/155
[52] U.S. Cl. .................. 363/87; 363/41; 363/129
[58] Field of Search .................. 363/35, 41, 44, 51, 363/54, 85, 45, 46, 87, 129

[56] References Cited
U.S. PATENT DOCUMENTS
3,849,719  11/1974  Geiersbach et al. .......... 363/85 X
4,028,607  6/1977   Watanabe .................. 363/51

*Primary Examiner*—William M. Shoop
*Assistant Examiner*—Peter S. Wong
*Attorney, Agent, or Firm*—Arnold E. Renner

[57] ABSTRACT

A power conversion unit for supplying electrical power to a load from a polyphase a.c. source includes a controlled rectifier bridge connected between the source and the load. Control of the rectifiers is provided through the generation of a firing wave signal for each phase of the source which wave signals are phase displaced with respect to the phase-to-phase source voltages by a prescribed amount. Reference signals proportional to the desired output of the bridge and steering signals defining prescribed relationships between the firing wave signals are combined with the wave signals to generate signals utilized to control the conduction of the bridge rectifiers.

14 Claims, 9 Drawing Figures

POWER CONVERSION UNIT

BACKGROUND OF THE INVENTION

The present invention relates generally to power conversion systems and more particularly to an improved system for supplying electrical power to a load from a polyphase alternating current (a.c.) source.

Many types of power conversion units are known. One of the most common units for converting a.c. to d.c. (direct current) is the so-called six controlled rectifier bridge. The most common controlled rectifier in use today is the thyristor. The thyristor is, basically, a three electrode device (anode, cathode and gate) which is rendered conductive upon the application of a positive forward bias across its anode and cathode and a suitable gating signal to the gate electrode. Commutation of the thyristor is achieved by the application thereto of a zero or negative bias between the anode and cathode.

The six rectifier (thyristor) bridge has a pair of thyristors associated with each phase of the a.c. source and by controlling the firing angle of the several thyristors, the average output voltage of the bridge is controlled. This is commonly called phase control. Firing angle, as used in this specification and as will be more fully explained hereinafter, refers to the point of rendering a thyristor conductive with respect to the source voltage. In this type of control, with an increase in the firing angle the output voltage of the bridge will decrease. Conversely, with a decrease in the firing angle the output voltage will increase.

One common method of control of the six thyristor bridge involves the generation of six so-called "cosine firing waves," one firing wave being associated with each of the thyristors. This known control further provides for the generation of a reference signal and, by a comparison of the reference signal with each of the several cosine firing waves, there are generated signals which are used to "gate on" (render conductive) the thyristors of the bridge.

From an operational standpoint, the six cosine firing wave system is for the most part satisfactory. It does, however, require a considerable amount of circuitry which must be reasonably well matched in order to maintain consistent phase displacement between the cosine firing waves and the phase voltages of the source.

SUMMARY OF THE INVENTION

It is, therefore, an object of the present invention to provide an improved power conversion unit.

It is a further object to provide a less expensive power conversion unit for supplying a load from a polyphase a.c. source.

Another object is to provide an improved a.c. to d.c. power conversion unit.

A still further object is to provide a power conversion unit employing a pair of controlled rectifiers for each phase of an a.c. source and to further provide an improved control for the rendering of each of those controlled rectifiers conductive.

The foregoing and other objects are achieved, in accordance with the present invention, by providing, in a power conversion unit for supplying electrical power to the load from a polyphase a.c. source, means which are connected to the source to develop a firing wave signal for each phase of the source. The firing wave signals are phase displaced with respect to the phase-to-phase voltages of the source. In addition, means are provided to generate steering signals which define specific relationships of the firing wave signals and these steering signals are combined with the firing wave signals and a reference signal proportional to the desired output of the power conversion unit to effect the generation of the actual gating signals for rendering conductive the several rectifiers of the bridge.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
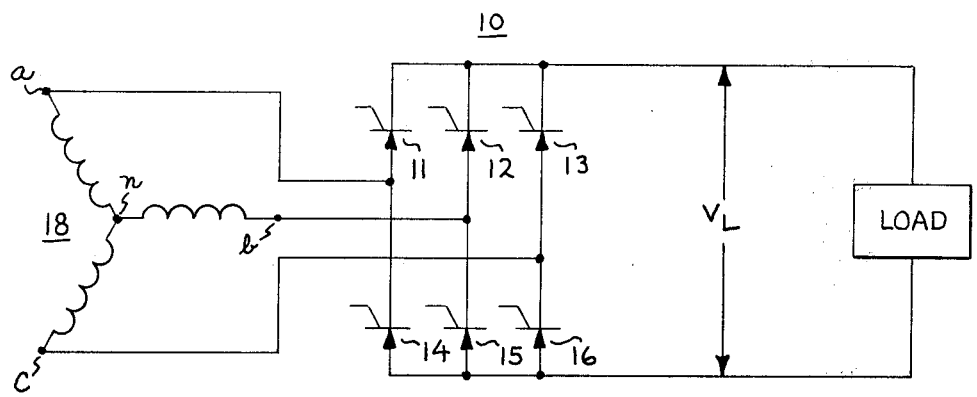
FIG. 1 is a schematic drawing of a typical six thyristor bridge supplying power to a load from a three phase a.c. source.

Referring now to FIG. 1, there is shown a standard or conventional system for supplying variable d.c. power to a load from a three phase a.c. source. In FIG. 1, reference character 10 indicates, generally, a six thyristor bridge comprised of thyristors 11 through 16. The a.c. source is represented by a wye-connected transformer secondary 18 having the windings an, bn and cn with the terminal points a, b and c being connected, respectively, to the junction points of thyristor pairs 11 and 14, 12 and 15 and 13 and 16, respectively. The output of the bridge 10 is connected to a load 20 and, as is well known in the art, by controlling the firing angle of each of the several thyristors in the bridge the voltage $V_L$ across the load may be varied. As is also well known in the art and as was earlier mentioned, each of the thyristors 11 through 16 is rendered conductive by the simultaneous application of a positive bias voltage between the anode and the cathode and a suitable gating signal to the gate electorde.

Figure 2A:
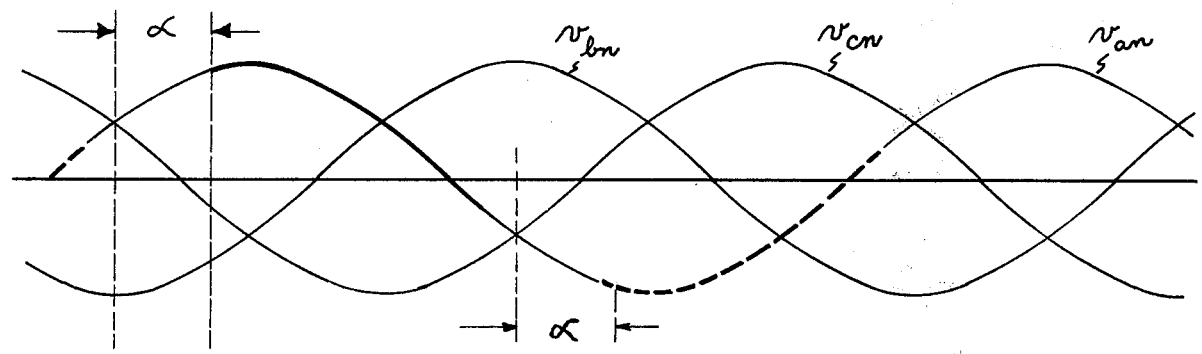
FIG. 2a shows wave shapes demonstrating the relationship of conventional three phase line-to-neutral voltages and the concept of firing angle.

FIG. 2a illustrates the three phase-to-neutral voltages of the source 18 in FIG. 1. These are labeled, respectively, $v_{an}$, $v_{bn}$ and $v_{cn}$. As is customary, each of these voltages is represented by a sine wave with the three sine waves being relatively displaced one from the other by 120 electrical degrees. The firing angle of a thyristor is also illustrated in FIG. 2a. The heavy line at the left of FIG. 2a represents the conduction period of the thyristor 11 of FIG. 1 with a firing angle, $\alpha$, of 45 degrees. The heavy dashed line in FIG. 2a illustrates the conduction period for the thyristor 14 of FIG. 1 with the same firing angle. It is noted that the angle, $\alpha$, is measured from the crossover of two phase-to-neutral voltages. By varying the firing angle, the average voltage output of the bridge can be varied, as is known in the art, and it is readily seen that with an $\alpha$ angle of zero degrees the bridge is outputting maximum voltage. As the $\alpha$ angle is increased, the average voltage to the load is decreased and the voltage applied across the load $V_L$ is defined by the equation:

$$V_L = (3\sqrt{3}\, V/\pi) \cosine \alpha;$$

wherein V is equal to the peak phase voltage of the source.

Figure 2B:
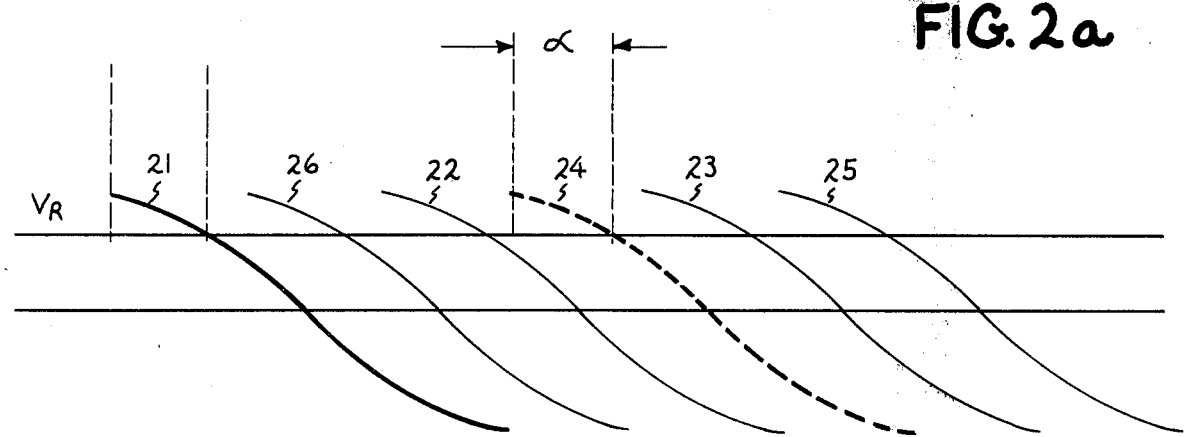
FIG. 2b illustrates the cosine firing waves typically used in the control of the firing of the bridge thyristors in accordance with the prior art.

FIG. 2b illustrates the firing method of the prior art which was previously mentioned. As shown in FIG. 2b, six firing wave signals designated, respectively, 21 through 26 are generated. Each wave has a generally sinusoidal shape with its peak value occurring, as shown when compared with FIG. 2a, at an $\alpha$ angle of zero degrees. Hence, these firing wave signals are often referred to as "cosine waves." The waves 21 through 26 are associated in use, respectively, with the six thyristors 11 through 16 of FIG. 1. A reference signal, $V_R$, having a level proportional to the desired output of the bridge is also provided. As is illustrated in FIG. 2b taken with 2a, it is seen that the value of $V_R$ shown corresponds to an $\alpha$ angle of 45 degrees. The intersection of cosine wave 21 and the signal $V_R$ is used to effect the generation of a gate signal for thyristor 11. After being rendered conductive, thyristor 11 continues in that state until the next of the "positive" side thyristors (11, 12 and 13) is fired. In the present illustration, thyristor 12 is the next positive thyristor to fire and this occurs with the crossing of the signal $V_R$ and cosine wave 22. Similarly, on the "negative" side of the bridge, as illustrated by the heavy dashed lines in FIGS. 2a and 2b, when the cosine wave 24 crosses the signal $V_R$, thyristor 14 is fired. In this manner each of these thyristors of the bridge of FIG. 1 is controlled to provide the output voltage. As previously indicated, this prior art control performs satisfactorily but does require the generation of six firing waves (FIG. 2b) thus necessitating a considerable amount of circuitry which must be reasonably well matched.

Figure 3A:
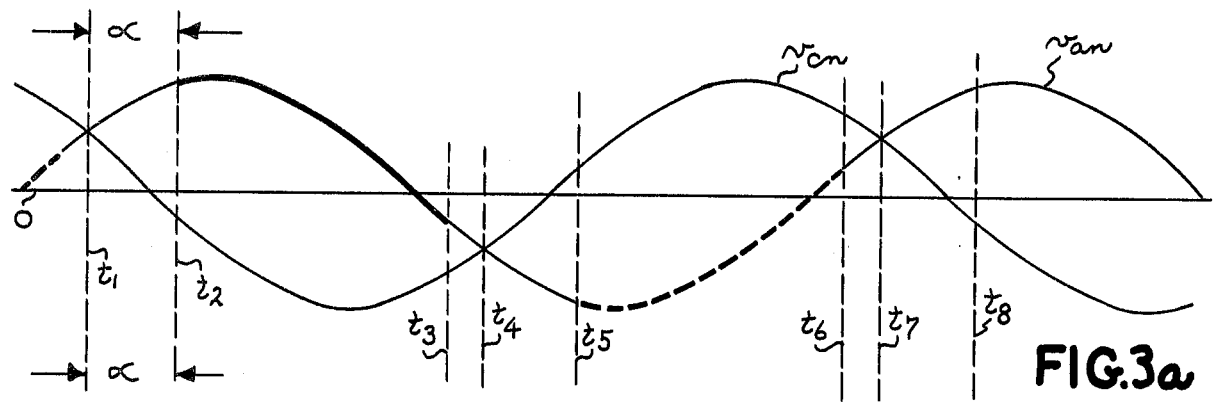
FIGS. 3a–3e are wave shapes helpful in the understanding of the present invention.

FIGS. 3a to 3e illustrate the overall operational mode of the present invention. FIG. 3a is similar to FIG. 2a excepting that, for sake of clarity, only two phase-to-neutral voltages $v_{an}$ and $v_{cn}$ are shown. Similar to the FIG. 2a illustration and again using as an example a firing angle $\alpha$ of 45 degrees, the heavy solid line of FIG. 3a defines the conduction period of thyristor 11 of the bridge of FIG. 1. Thyristor 11, with a firing angle of 45 degrees, will conduct from time $t_2$ to time $t_3$. Time $t_3$ is the time of firing of the next positive thyristor; i.e., thyristor 12. Thyristor 14 will conduct, as shown by the heavy dashed line in FIG. 3a, from the time $t_5$ to the time $t_6$. At time $t_6$, thyristor 15 will fire.

Figure 3B:
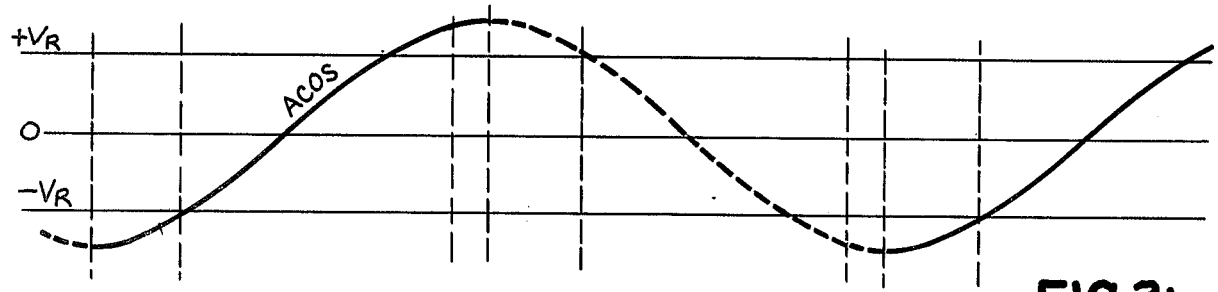
Figure 3C:
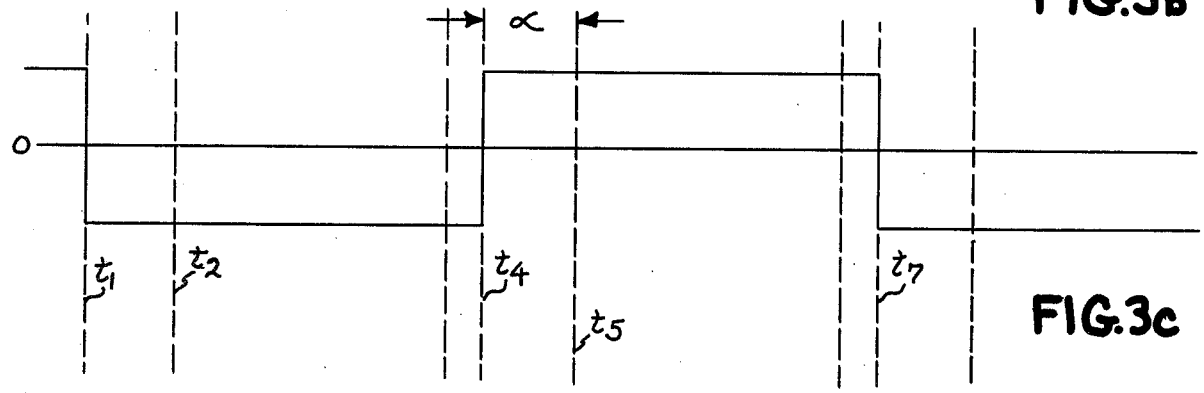
Figure 3D:
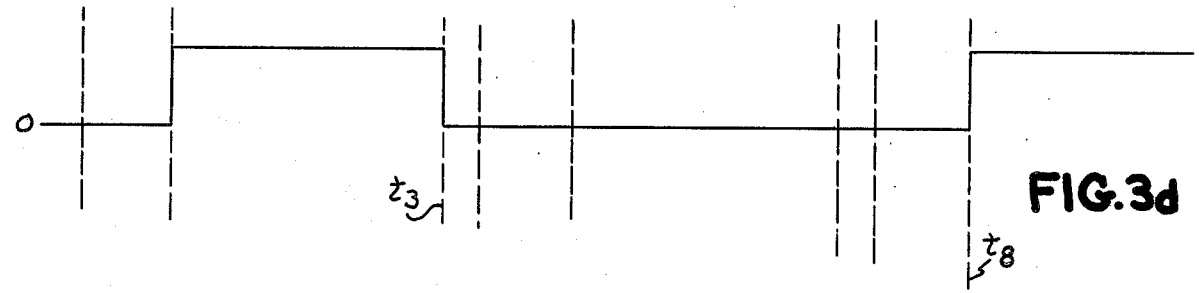
Figure 3E:
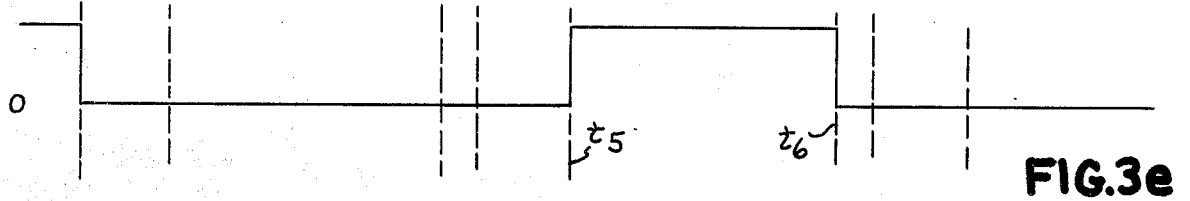

FIG. 3b illustrates the "modified cosine" firing wave (ACOS) applicable to the thyristor pair 11 and 14 of the FIG. 1 depiction. It is noted that, in the implementation here being described, this wave differs from the prior art showing of FIG. 2b in that it is essentially 180 degrees phase displaced with respect thereto. The heavy solid line shown in FIG. 3b illustrates the total period available to the firing of thyristor 11 while the heavy dashed line shows the time allocated to the permissible firing of thyristor 14. This is depicted in another way in FIG. 3c where, between the time $t_1$ and $t_4$ thyristor 11 is allowed to be fired while thyristor 14 would be locked out from firing. Conversely, from time $t_4$ to $t_7$ thyristor 14 is allowed to be fired and thyristor 11 is prevented from firing. Referring again to FIG. 3b, there is further shown two level signals $+V_R$ and $-V_R$. These two signals are generated in a manner to be hereinafter described and represent the desired level of bridge operation. By comparing FIGS. 3a, 3b and 3d it is seen that with the reference levels set to correspond to a firing angle ($\alpha$) of 45 degrees, thyristor 11 will conduct from the time $t_2$ to the time $t_3$, the time of the firing of the next scheduled positive thyristor. Referencing now to FIGS. 3a, 3b and 3e, it is seen that thyristor 14, in this example, will actually begin conduction at time $t_5$ and will terminate conduction at time $t_6$. Similar analyses could be made for each of the other FIG. 1 thyristors 12, 13, 15 and 16 but such is believed unnecessary in that they would follow similar patterns with a phase displacement of approximately 120 degrees with respect to that shown in FIG. 3b. Such derivations are believed obvious to one skilled in the art.

Figure 4:
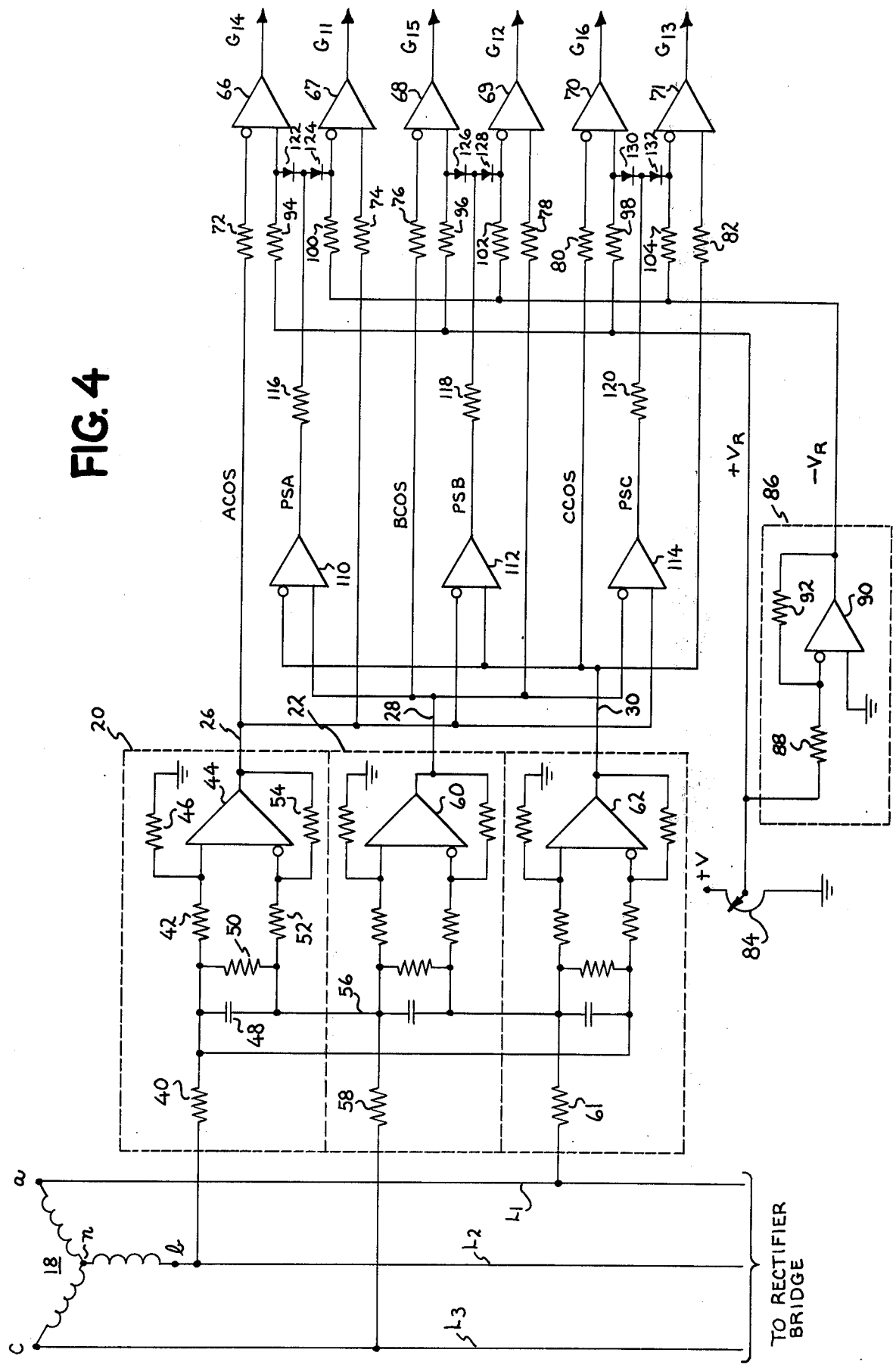
FIG. 4 is a schematic drawing illustrating the control of the present invention in its preferred embodiment.

FIG. 4 shows the preferred embodiment for implementing the present invention. Referencing now that figure, the secondary of the transformer 18, representing the source, is again shown as connected to the rectifier bridge (FIG. 1) by lines $L_1$, $L_2$ and $L_3$. The three lines $L_1$, $L_2$ and $L_3$ are also connected to three firing wave generators shown within the dashed lined blocks 20, 22 and 24. Each of the blocks 20, 22 and 24 provides an output, respectively, on lines 26, 28 and 30. The output of block 20 on line 26 will be the wave shape ACOS shown in FIG. 3b as will be more fully understood as this description proceeds.

Line $L_2$ (terminal b of the source 18) is connected by way of two series connected resistors 40 and 42 to the noninverting input of a differentially connected operational amplifier 44. This input is further connected to ground by way of a resistor 46. A parallel combination of a capacitor 48 and a resistor 50 has one end thereof connected to the junction of the resistors 40 and 42 and the other end connected by way of a series connected resistor 52 to the inverting input of the amplifier 44. The inverting input is further connected to the output of the amplifier by way of a feedback resistor 54. The junction of the capacitor 48, resistor 50 and resistor 52 is connected by way of a line 56 and a resistor 58 to line $L_3$. The function of the circuitry of the generator within block 20 is to provide the firing wave signal ACOS (described with respect to FIG. 3b) as an output on line 26, as previously indicated. That is, the signal ACOS is, in the terminology of the prior art, a "modified cosine firing wave" which lags the phase-to-neutral voltage of the phase to which it is associated by 120 degrees; i.e., ACOS is in phase with the voltage $v_{bn}$. It is noted, however, that the signal ACOS is not derived from a phase-to-neutral voltage which is often not available or even if it were would probably include too much noise to be of use, but is in fact derived from the phase-to-phase voltage $v_{bc}$; that is, the signal ACOS is 30 degrees lagging with respect to the phase-to-phase voltage $v_{bc}$. The outputs of the two additional firing wave signal generators 22 and 24 are, as previously indicated, delivered on lines 28 and 30 and are designated BCOS and CCOS, respectively. These signals have not been illustrated in detail in the drawing but it is recognized that BCOS will lag ACOS by 120 degrees and CCOS will lag BCOS by 120 degrees. It is not believed necessary to fully go through the details of the two generators 22 and 24 and their development of the BCOS and CCOS signals in that they are essentially identical to that described with respect to generator 20. Suffice it to say that the source voltages which are applied to the operational amplifier 60 of generator 22 are signals derived from the voltage source lines $L_3$ and $L_1$ while those which are delivered to an amplifier 62 of generator 24 are derived, respectively, from lines L₁ and lines L₂. A suitable input resistor 61 is associated with generator 24 corresponding to resistors 40 and 58 of the other two generators.

The three firing wave signals ACOS, BCOS and CCOS form the inputs to six operational amplifiers, operating in the comparison mode, designated by the reference characters 66 through 71. Specifically, the ACOS signal (line 26) is applied by way of a resistor 72 to the inverting input of amplifier 66 and by way of a resistor 74 to the noninverting input of amplifier 67. The BCOS signal is applied by way of a resistor 76 to the inverting input of amplifier 68 and by way of resistor 78 to the noninverting input of amplifier 69. In a similar manner, the CCOS signal is applied by way of a resistor 80 to the inverting input of amplifier 70 and via resistor 82 to the noninverting input of amplifier 74. The output of the amplifiers 66 through 71 are utilized to effect the gating signals which are applied to the gating electrodes of the thyristors 11 through 16 of the bridge 10 of FIG. 1 as will be more fully explained hereinafter.

Each of the amplifiers 66 through 71 is provided with a further input which is a one of the $+V_R$ or $-V_R$ signals which were illustrated and discussed briefly with respect to FIG. 3b. These signals, as was indicated, are preferably d.c. levels proportional to the desired output of the conversion bridge. As an exemplary method, signals $+V_R$ and $-V_R$ are illustrated (FIG. 4) as being generated through the use of a potentiometer to thereby permit varying of the magnitude of these signals in accordance with the desired output of the bridge. Thus, the potentiometer 84 is connected between a source of positive voltage indicated as $+V$ and ground and the wiper arm of that potentiometer provides a signal which is designated $+V_R$. The inverse of that signal $-V_R$ is obtained by a simple inverting network 86 which has a unity gain. As illustrated in FIG. 4, the signal $+V_R$ is applied by way of a resistor 88 to the inverting input of an operational amplifier 90 which has its noninverting input connected to ground. A simple feedback resistor 92 connected between the output of the amplifier 90 and its inverting input results in an output from the inverter 86 which is the $-V_R$ signal. The signals $+V_R$ and $-V_R$ will, therefore, be of substantially equal magnitude but of opposite relative polarity. As indicated, this showing of the generation of $+V_R$ and $-V_R$ is merely exemplary. In actual practice, the development of the basic reference signal could be far more complex than the potentiometer shown; as, for example, the output of an overall speed control as is well known in the art. The details of the actual derivation of the basic reference signal are not, however, important to the present invention and that illustrated was selected for sake of simplicity.

As further illustrated in FIG. 4, the signal $+V_R$ serves as an input to each of the noninverting inputs of amplifiers 66, 68 and 70 by way, respectively, of resistors 94, 96 and 98. In a similar manner, the $-V_R$ signal is applied to the inverting inputs of amplifiers 67, 69 and 71 by way of resistors 100, 102 and 104, respectively. Thus, it is seen that each comparison amplifier 66 through 71 is capable of outputting a signal when prescribed relationships exist between the appropriate ACOS, BCOS and CCOS signal and the appropriate reference value $+V_R$ or $-V_R$.

There remains, however, the prevention of simultaneous firing of two thyristors in a phase leg of the bridge. Accordingly, steering signals are generated to insure the proper operation of the control. The steering signals are the outputs of three additional operational amplifiers 110, 112 and 114 which also act in the comparison mode. The function of these amplifiers is to define prescribed relationships between the three firing wave signals ACOS, BCOS and CCOS. To this end, the ACOS signal is provided to the inverting input of amplifier 112 and to the noninverting input of amplifier 114. The BCOS signal serves as an input to the noninverting input of amplifier 110 and to the inverting input of signal 114. The CCOS signal acts as an input to the noninverting input of amplifier 112 and to the inverting input of amplifier 110. The outputs of the three operational amplifiers 110, 112 and 114 are designated, respectively, PSA, PSB and PSC. As seen in FIG. 4, PSA is positive when the CCOS signal is more negative than the signal BCOS and is negative when BCOS is more negative than CCOS. Similarly, PSB is positive when ACOS is more negative than CCOS and negative when CCOS is more negative than ACOS. PSC is positive when BCOS is more negative than ACOS and negative when ACOS is more negative than BCOS.

Referencing still FIG. 4, as previously stated, the output of the operational amplifiers 66 through 71 serve to effect the gating signals to the thyristors 11 through 16 of the bridge (FIG. 1). That is, these signals would not normally be applied directly to the gates of the thyristors but would be used to appropriately enable some conventional gating circuitry; e.g., a pulse train firing network, such as is well known in the art. The term gating signal as here used is, therefore, employed in that context. The output ($G_{14}$) of amplifier 66 is the gating signal to thyristor 14 while the amplifier 67 provides an output $G_{11}$ which serves as the gating signal to thyristor 11. In a similar manner, the outputs of amplifiers 68 and 69 serve as gating signals for thyristors 15 and 12, respectively, while amplifiers 70 and 71 output gating signals to the two thyristors 16 and 13. Thus, adjacent pairs of amplifiers 66 through 71 may be considered as amplifier pairs corresponding to the thyristor pairs of the bridge.

The steering signals from the amplifiers 110, 112 and 114 are applied to properly steer the operation of operational amplifier pairs. Thus, as is shown in FIG. 4, the signal PSA from amplifier 110 is applied by way of a resistor 116 to the junction of a pair of series connected diodes 122 and 124 which are connected between the noninverting input of amplifier 66 and the inverting input of amplifier 67. In a similar manner, the PSB signal is applied by way of resistor 118 to the junction of a diode pair 126 and 128 connected between the noninverting input of amplifier 68 and the inverting input of amplifier 69. The PSC signal is applied by way of a resistor 120 to the junction of a diode pair 130 and 132 connected between the noninverting input of amplifier 70 and the inverting input of amplifier 71.

Looking now to the operation of the FIG. 4 circuit as a whole and using the gating of the thyristor pair 11 and 14 as an example, with the $-V_R$ signal applied to the inverting input of amplifier 67 and the ACOS signal applied to the noninverting input of that amplifier, when the ACOS signal is more positive than $-V_R$, the output $G_{11}$ switches positive to turn on thyristor 11 provided that the PSA signal is negative. When the PSA signal is positive, the inverting input of amplifier 67 is always more positive than the noninverting input thus preventing a positive output at $G_{11}$. The development for the gating signal $G_{14}$ for thyristor 14 operates in the opposite sense. As is seen, the positive reference signal $+V_R$ is applied to the noninverting input of amplifier 66 and the ACOS signal is applied to the inverting input. At the point in time when $+V_R$ becomes more positive than ACOS, the output of amplifier 66 switches positive to provide the gating signal $G_{14}$ provided that the PSA signal is positive. In this instance, a negative PSA signal applied to the noninverting input of amplifier 66 prevents that amplifier from switching positive. Each of the gating signals for the thyristors 12, 13, 15 and 16 is generated in substantially the identical way as is illustrated by the showing in FIG. 4 and it is believed not necessary to explain these in detail.

Thus it is seen by the present invention there has been provided a means for providing the gating signals of a six thyristor bridge to supply a load from a polyphase a.c. source which system is both economical and reliable. While there has been shown and described what is at present considered to be the preferred embodiment of the invention, modifications thereto will readily occur to those skilled in the art. For example, operational amplifiers have been used throughout the description of FIG. 4 and it is readily obvious that other forms of comparators could be used. In addition, the firing waves could be developed by other than the differentially connected operational amplifiers as shown within the blocks 20, 22 and 24. As an example of the latter possible modification, transformers could be used and it would even be possible to use RC networks if isolation were not required. It is not desired, therefore, that the invention be limited to the specific circuit shown and described and it is intended to cover in the appended claims all such modifications as fall within the true spirit and scope of the invention.

What is claimed is:

1. A circuit for controlling the time of rendering conductive each of a plurality of controlled rectifiers comprising a power conversion bridge to supply electrical power to a load from a polyphase a.c. source, said circuit comprising:
   (a) first means connected to said source for developing a substantially sinusoidal firing wave signal for each phase of said source, each of said wave signals being phase displaced by a prescribed amount with regard to a respective phase voltage of said source;
   (b) second means to provide relatively positive and negative reference signals of substantially equal magnitude designating the desired output of said bridge;
   (c) third means responsive to said firing waves signals to produce a single steering signal for each phase of said source, each of said steering signals defining a prescribed relationship between selected pairs of said firing wave signals; and,
   (d) fourth means responsive to said firing wave signals, said reference signals and said steering signals to selectively generate signals operative to render the controlled rectifiers of the bridge conductive.

2. The invention in accordance with claim 1 wherein said second means provides reference signals of d.c. levels.

3. The invention in accordance with claim 1 wherein said third and fourth means are each comprised of comparison means.

4. The invention in accordance with claim 1 wherein said first means includes differentially connected operational amplifiers connected to said source.

5. A control circuit for governing the d.c. voltage applied to a load from a source of three-phase a.c. power by controlling the firing angles at which a plurality of controlled rectifiers comprising a power conversion bridge are rendered conductive comprising:
   (a) means for generating a reference signal proportional to the desired voltage output of the bridge, said reference signal having two components of substantially equal magnitude but of opposite relative polarity;
   (b) means to generate three substantially sinusoidal firing wave signals corresponding, respectively, to the three phase voltages of said source;
   (c) means to generate three steering signals each defining a prescribed relationship between selected pairs of said firing wave signals; and,
   (d) means responsive to said reference signal, said firing wave signals and said steering signals to govern the operation of the controlled rectifiers of the bridge.

6. A power conversion unit system for supplying electrical power from a polyphase a.c. source to a load comprising:
   (a) a controlled rectifier bridge connected between said source and said load, said bridge having at least two controlled rectifiers associated with each phase of the source; and,
   (b) a control circuit for controlling the firing angles of said rectifiers to thereby control the average voltage applied to said load, said control circuit comprising,
      (1) means connected to said source for developing a substantially sinusoidal firing wave signal for each phase of said source, each of said wave signals being phase displaced by a prescribed amount with respect to a respective phase-to-phase voltage of said source,
      (2) means to provide relatively positive and negative reference signals of substantially equal magnitude proportional to the desired output of said bridge,
      (3) first comparison means responsive to said firing wave signals to produce a single steering signal for each phase of the source, each of said steering signals defining a prescribed relationship between selected pairs of said wave signals, and,
      (4) second comparison means responsive to said firing wave signals, said reference signals and said steering signals to selectively generate signals operative to render the controlled rectifiers of the bridge conductive.

7. The invention in accordance with claim 6 wherein said second means provides reference signals of d.c. levels.

8. The invention in accordance with claim 6 wherein said means for developing said firing wave signals includes differentially connected operational amplifiers.

9. A six thyristor bridge system for supplying controlled d.c. power to a load from a three phase a.c. source comprising:
   (a) a rectifying bridge including a pair of thyristors associated with each phase of the source, each of said thyristors being rendered conductive through the application of a gating signal applied thereto;
   (b) means for producing relatively positive and negative reference signals of substantially the same absolute magnitude proportional to the desired output from said bridge;

(c) means for producing a substantially sinusoidal firing wave signal for each phase of said source, each of said firing wave signals having a prescribed phase relationship with respect to a respective source phase voltage;

(d) means responsive to said firing wave signals to develop a single steering signal for each phase of said source, each of said steering signals defining a prescribed relationship between selected pairs of said firing wave signals; and, (e) means responsive to said reference signals, said firing wave signals and said steering signals to produce the gating signals for said thyristors.

10. The invention in accordance with claim 9 wherein said second means provides reference signals of d.c. levels.

11. The invention in accordance with claim 9 wherein said means responsive to said firing waves comprises comparison means.

12. The invention in accordance with claim 9 wherein said means responsive to said firing wave signals and said means responsive to said steering signals comprise, respectively, first and second comparison means.

13. The invention in accordance with claim 9 wherein said means for developing said firing wave signals includes differentially connected operational amplifiers.

14. The invention in accordance with claim 9 wherein said last recited means includes six comparison means, each of said comparison means producing a signal for effecting the gating of a corresponding one of the thyristors of the rectifying bridge.

* * * * *